(12) United States Patent
Carlson et al.

(10) Patent No.: US 9,957,427 B2
(45) Date of Patent: *May 1, 2018

(54) REACTIVE ADHESIVE WITH ENHANCED ADHESION TO METALLIC SURFACES

(71) Applicant: H.B. Fuller Company, St. Paul, MN (US)

(72) Inventors: Brian W. Carlson, Woodbury, MN (US); Rituparna Paul, St. Paul, MN (US); Mutombo J. Muvundamina, Johnson City, TN (US); Felix D. Mai, Ludwigshafen (DE); David B. Malcolm, Maplewood, MN (US)

(73) Assignee: H.B. Fuller Company, St. Paul, MN (US)

( * ) Notice: Subject to any disclaimer, the term of this patent is extended or adjusted under 35 U.S.C. 154(b) by 101 days.

This patent is subject to a terminal disclaimer.

(21) Appl. No.: 14/970,006

(22) Filed: Dec. 15, 2015

(65) Prior Publication Data

US 2016/0168434 A1 Jun. 16, 2016

Related U.S. Application Data

(60) Provisional application No. 62/091,956, filed on Dec. 15, 2014, provisional application No. 62/091,942, filed on Dec. 15, 2014.

(51) Int. Cl.

| | |
|---|---|
| *C09J 175/04* | (2006.01) |
| *B32B 7/12* | (2006.01) |
| *B32B 15/14* | (2006.01) |
| *B32B 15/18* | (2006.01) |
| *C09J 7/00* | (2018.01) |
| *C09J 5/04* | (2006.01) |
| *C09J 5/06* | (2006.01) |
| *B32B 15/095* | (2006.01) |
| *B32B 27/40* | (2006.01) |
| *B32B 27/28* | (2006.01) |
| *B32B 37/12* | (2006.01) |
| *B32B 37/16* | (2006.01) |
| *C09J 175/00* | (2006.01) |

(52) U.S. Cl.
CPC ............... *C09J 175/04* (2013.01); *B32B 7/12* (2013.01); *B32B 15/095* (2013.01); *B32B 15/14* (2013.01); *B32B 15/18* (2013.01); *B32B 27/28* (2013.01); *B32B 27/40* (2013.01); *B32B 37/1207* (2013.01); *B32B 37/16* (2013.01); *C09J 5/04* (2013.01); *C09J 5/06* (2013.01); *C09J 7/00* (2013.01); *B32B 2037/1253* (2013.01); *B32B 2037/1269* (2013.01); *B32B 2262/0261* (2013.01); *B32B 2307/50* (2013.01); *B32B 2375/00* (2013.01); *B32B 2405/00* (2013.01); *B32B 2457/00* (2013.01); *B32B 2471/02* (2013.01); *B32B 2605/00* (2013.01); *C09J 175/00* (2013.01); *C09J 2475/00* (2013.01); *C09J 2475/003* (2013.01)

(58) Field of Classification Search
CPC .... C09J 175/00; C09J 175/04; C09J 2475/00; C09J 2475/003; C09J 5/04; C09J 5/06; C09J 7/00; B32B 15/095; B32B 15/14; B32B 15/18; B32B 2037/1253; B32B 2037/1269; B32B 2262/0261; B32B 2307/50; B32B 2375/00; B32B 2405/00; B32B 2457/00; B32B 2471/02; B32B 2605/00; B32B 2605/2728; B32B 2605/40; B32B 37/1207; B32B 37/16; B32B 7/12

USPC ............. 428/423.1, 425.8, 425.9; 528/44, 85

See application file for complete search history.

(56) References Cited

U.S. PATENT DOCUMENTS

| | | | |
|---|---|---|---|
| 5,143,987 A | 9/1992 | Hansel et al. | |
| 5,470,899 A | 11/1995 | Gulbins et al. | |
| 5,492,961 A * | 2/1996 | Brock .................. | C09D 151/08 524/457 |
| 5,608,000 A | 3/1997 | Duan et al. | |
| 5,610,232 A | 3/1997 | Duan et al. | |
| 5,654,391 A * | 8/1997 | Gobel ................ | C08G 18/0819 252/182.26 |
| 5,703,158 A | 12/1997 | Duan et al. | |
| 5,710,215 A | 1/1998 | Abend | |
| 6,017,998 A | 1/2000 | Duan et al. | |
| 6,348,548 B1 | 2/2002 | Abend | |
| 6,593,435 B2 | 1/2003 | Abend | |
| 6,686,415 B1 | 2/2004 | Terfloth et al. | |
| 6,797,764 B2 | 9/2004 | Sagiv et al. | |
| 7,498,380 B2 | 3/2009 | Ganster et al. | |
| 8,846,198 B2 | 9/2014 | Buchner et al. | |
| 2002/0022680 A1 | 2/2002 | Guse et al. | |
| 2002/0164486 A1 | 11/2002 | Guse et al. | |
| 2003/0100626 A1* | 5/2003 | Sapper ............... | C08G 18/0823 522/79 |
| 2003/0157337 A1 | 8/2003 | Abend | |
| 2004/0204520 A1 | 10/2004 | Bell et al. | |
| 2005/0288430 A1 | 12/2005 | Gindin et al. | |
| 2008/0171208 A1 | 7/2008 | Buchner et al. | |
| 2008/0262131 A1 | 10/2008 | Linnenbrink et al. | |
| 2009/0123757 A1* | 5/2009 | Pudleiner .................. | B32B 7/12 428/412 |
| 2009/0227724 A1 | 9/2009 | Ganster et al. | |
| 2009/0240005 A1 | 12/2009 | Kraus et al. | |
| 2010/0193591 A1 | 8/2010 | Rancien et al. | |
| 2011/0244228 A1 | 10/2011 | Blum et al. | |
| 2012/0012251 A1 | 1/2012 | Burckhardt et al. | |

(Continued)

FOREIGN PATENT DOCUMENTS

| | | |
|---|---|---|
| CA | 2355908 | 6/2000 |
| GB | 2400104 | 6/2014 |

(Continued)

*Primary Examiner* — Thao T Tran

(74) *Attorney, Agent, or Firm* — Kirsten Stone; Allison Johnson

(57) ABSTRACT

Disclosed is an aqueous adhesive composition including a surface-deactivated solid isocyanate and a blend of two different polyurethanes. A method of making an article that includes a coated adhesive layer and article made thereby are also disclosed.

26 Claims, No Drawings

(56) References Cited

U.S. PATENT DOCUMENTS

| | | |
|---|---|---|
| 2012/0021196 A1 | 1/2012 | Kenney |
| 2012/0112133 A1 | 5/2012 | Bahnmüller et al. |
| 2012/0171459 A1 | 7/2012 | Herbert |
| 2013/0273375 A1 | 10/2013 | Achten et al. |
| 2015/0017452 A1 | 1/2015 | Schmitz-Stapela et al. |
| 2015/0037555 A1 | 2/2015 | Mai et al. |
| 2015/0240128 A1 | 8/2015 | Muvundamina et al. |
| 2016/0168423 A1* | 6/2016 | Carlson .................. C09J 175/04 428/220 |

FOREIGN PATENT DOCUMENTS

| | | |
|---|---|---|
| WO | WO2012069587 | 5/2012 |
| WO | WO2012092620 | 7/2012 |
| WO | WO2015017531 | 2/2015 |
| WO | WO2015130949 | 9/2015 |

* cited by examiner

REACTIVE ADHESIVE WITH ENHANCED ADHESION TO METALLIC SURFACES This application claims the benefit of U.S. Provisional Application No. 62/091,956, filed Dec. 15, 2014, and U.S. Provisional Application No. 62/091,942, filed Dec. 15, 2014, both of which are incorporated herein.

The invention relates to an aqueous adhesive composition. In particular, the adhesive composition includes a surface-deactivated solid isocyanate and two different polyurethane dispersions having functional groups reactive with isocyanate.

SUMMARY OF THE INVENTION

In one aspect, the invention features an aqueous adhesive composition including a surface-deactivated solid isocyanate, a first polyurethane dispersion including a first polyurethane having functional groups reactive with isocyanate, and a second polyurethane dispersion including a second polyurethane different from the first polyurethane. The second polyurethane is a carboxyl acid functional polyurethane having an acid number of from 10 to 30, and a unimodal weight average Molecular Weight (Mw) of no greater than about 50,000 g/mole.

In one embodiment, first polyurethane as a weight average Molecular Weight (Mw) of no less than about 50,000 g/mole.

In another aspect, the invention features an article including a substrate, and an adhesive layer disposed on at least one surface of the substrate. The adhesive layer includes a surface-deactivated solid isocyanate, a first polyurethane having functional groups reactive with isocyanate, and a second polyurethane different from the first polyurethane. The second polyurethane is a carboxyl acid functional polyurethane having an acid number of from 10 to 30, and a unimodal weight average Molecular Weight (Mw) of no greater than about 50,000 g/mole.

In yet another aspect, the invention features an article including a first substrate, a second substrate, and an adhesive layer disposed between the first substrate and the second substrate. The adhesive layer is derived from any one of the aforesaid aqueous adhesive compositions.

In yet another aspect, the invention features a method of making an article having a first substrate. The method includes applying any one of the aforesaid aqueous adhesive compositions to a first major surface of the first substrate, and drying the aqueous adhesive composition to form an adhesive coating layer on the first major surface of the first substrate.

In one embodiment, the method further includes bringing a second substrate into contact with the adhesive layer such that the first and the second substrate is in direct contact with the adhesive layer in between to form an article, and applying heat and pressure to the article.

In yet another aspect, the invention features a method of making an article having a first substrate and a second substrate. The method includes applying any one of the aforesaid aqueous adhesive compositions to a first major surface of the first substrate to form an adhesive coating layer thereon, bringing the second substrate into contact with the adhesive coating layer such that the first and the second substrates are in direct contact with the adhesive layer in between to form the article, and applying heat and pressure to the article.

In some embodiments, at least one substrate is a metallic substrate.

The aqueous adhesive composition of the invention is useful for bonding two substrates together through a coated adhesive layer derived from the aqueous adhesive composition.

The coated adhesive layer can have any suitable thickness including, e.g., at least 10 microns (μm), at least 25 μm, at least 50 μm, from about 25 μm to about 200 μm, or from about 25 μm to about 150 μm.

The coated adhesive layer can be formed using a variety of techniques including, e.g., direct coating one layer on one major surface of a substrate, passing a dried coated adhesive layer through a coater multiple times (e.g., an additional aqueous adhesive composition is coated on a dried coated adhesive layer, and the additionally coated aqueous composition is then dried (the process can be repeated multiple times)), and combinations thereof. The coated adhesive layer can be derived from the same or different aqueous adhesive compositions.

The drying temperature can be any suitable temperature or series of temperatures, but preferably is maintained at a temperature that is sufficiently low to prevent the surface-deactivated solid isocyanate from activating (i.e., crosslinking). During drying, the adhesive layer preferably is maintained at a temperature of no greater than about 70° C., no greater than about 60° C., or even no greater than about 55° C.

The coated adhesive layer on a substrate can be heated to a temperature e.g., at least 60° C., at least 75° C., from about 60° C. to about 150° C., or from about 75° C. to about 100° C. to activate the cure of the layer to form a cured bond with a substrate, or between two substrates.

The coated adhesive layer preferably has a degree of crystallinity and a peak melting temperature that is sufficiently high to allow transportation and storage of the pre-coated substrates, and also sufficiently low to allow heat activation of the cure of the coated adhesive layer. One useful measure of crystallinity is enthalpy of fusion. The enthalpy of fusion and the peak melting temperature of a coated adhesive layer is measured using a dried adhesive film. When in the form of a dried film, the coated adhesive layer exhibits an enthalpy of fusion of at least 25 J/g, from about 25 J/g to about 70 J/g, or from about 35 J/g to about 70 J/g.

The coated adhesive layer also preferably exhibit a peak melting temperature of at least 30° C., at least 40° C., from about 30° C. to about 80° C., or from about 40° C. to about 60° C.

The pre-coated substrates with the dried coated adhesive layer is storage stable at room temperature (i.e., from about 22° C. to about 25° C.) and remains heat curable.

The coated adhesive layer exhibits a 180 degree peel strength increase of at least 30%, at least 50%, at least 60%, relative to a control (EM9002-100 commercially available from HB Full (St. Paul, Minn.)), according to the herein described Cured 180 Degree Peel Strength test method.

Other features and advantages of the invention will be apparent further from the following description and the claims.

GLOSSARY

The term "polyurethane" means polyurethane as well as polyurethane that contains urea groups in the backbone of the polyurethane.

The term "aqueous dispersion" means an aqueous dispersion, aqueous emulsion, aqueous suspension, and aqueous solution.

The term "Control I" means the heat curable adhesive composition commercially available under the trade designation EM9002-100 from HB Fuller Company (St. Paul, Minn.).

Other features and advantages will be apparent from the following description of the preferred embodiments and from the claims.

DETAILED DESCRIPTION

Aqueous Adhesive Composition

The aqueous adhesive composition of the invention includes a surface-deactivated solid isocyanate, a first polyurethane dispersion including a first polyurethane, and a second polyurethane dispersion including a second polyurethane.

The first polyurethane dispersion including a first polyurethane having functional groups that are capable of reacting with isocyanate groups. The second polyurethane dispersion is different from the first polyurethane dispersion. The second polyurethane dispersion includes a second polyurethane that is a carboxylic acid functional polyurethane having other functional groups reactive with isocyanate. The two polyurethanes dispersions and the surface-deactivated solid polyisocyanate can be supplied separately as a two part system, and then blended together prior to the application. Alternately, the two polyurethanes dispersions and the surface-deactivated solid polyisocyanate can be supplied as a one part system that includes a blend of the two polyurethane dispersions and the surface-deactivated solid isocyanate.

The aqueous adhesive composition can be applied to a major surface of a substrate using a variety of application techniques including, spraying (e.g. spiral and splatter spraying), coating (e.g. roll, slot, gravure, curtain, and pattern), and combinations thereof. One useful application method includes roll coating the aqueous composition at a desirable coat weight onto a substrate, and then passing the coated aqueous composition through a drying tunnel to form a dried, coated adhesive layer. The drying temperature in the tunnel can be any suitable temperature or series of temperatures, but preferably is maintained at a temperature that is sufficiently low to prevent the surface-deactivated solid isocyanate from activating (i.e., crosslinking). During drying the coated adhesive layer preferably is maintained at a temperature of no greater than about 70° C., no greater than about 60° C., or even no greater than about 55° C.

First Polyurethane Dispersion

The first polyurethane dispersion includes a first polyurethane that is film-forming and can be a single type of polyurethane or a blend of at least two different polyurethanes. The first polyurethane includes functional groups that are capable of reacting with isocyanate functional groups. Useful functional groups reactive to isocyanate include hydroxyl, amino, carboxylic acid, amide, mercaptan, and combinations thereof.

The first polyurethane preferably has a weight average molecular weight of no less than 50,000 gram/mole (g/mole), and no greater than 125,000 g/mole, or no greater than 100,000 g/mole.

Suitable first polyurethanes are derived from a polyol and a polyisocyanate. Examples of useful polyols include polyester polyols, polyether polyols, and combinations thereof. Useful polyester polyols include, e.g., crystalline polyester polyols and amorphous polyester polyols.

Suitable polyester polyols include, e.g., polyester polyols derived from linear dicarboxylic acids, derivatives of dicarboxylic acids (e.g., anhydrides, esters and acid chlorides), aliphatic polyols, cyclo aliphatic polyols, polyols, branched polyols, and combinations thereof. Examples of useful dicarboxylic acids from which the polyester polyol can be derived include adipic acid, succinic acid, sebacic acid, dodecanedioic acid, and combinations thereof. Examples of useful aliphatic diols from which the polyester polyol can be derived include ethylene glycol, 1, 3-propanediol, 1, 4-butanediol, 1, 5-pentanediol, 1, 6-hexanediol, neopentyl glycol, and combinations thereof. Useful polyester polyols include, e.g., polyester polyols derived from 1, 4-butanediol, 1, 6-hexanediol, and combinations thereof including, e.g., polyester polyols derived from adipic acid and 1, 4-butanediol, adipic acid and 1, 6-hexanediol, adipic acid, 1, 6-hexanediol, and neopentyl glycol, and combinations thereof.

Suitable polyether polyols include the products obtained from the polymerization of a cyclic oxide, e.g., ethylene oxide, propylene oxide, butylene oxide, and tetrahydrofuran, or by the addition of one or more such oxides to polyfunctional initiators having at least two active hydrogens, e.g., water, polyhydric alcohols (e.g., ethylene glycol, propylene glycol, diethylene glycol, cyclohexane dimethanol, glycerol, trimethylol-propane, pentaerythritol and bisphenol A), ethylenediamine, propylenediamine, triethanolamine, and 1,2-propanedithiol. Particularly useful polyether polyols include, e.g., polyoxypropylene diols and triols, poly(oxyethylene-oxypropylene)diols and trio is obtained by the simultaneous or sequential addition of ethylene oxide and propylene oxide to appropriate initiators and polytetramethylene ether glycols obtained by the polymerization of tetrahydrofuran.

Useful first polyisocyanates have at least two free isocyanate groups in each molecule and include, diiosocyantes, triisocyanates, higher order polyisocyanates, and combinations thereof). Examples of useful polyisocyanates include e.g., aliphatic isocyanates (e.g. hexamethylene diisocyanate (HDI)), tetramethylxylylene diisocyanate (TMXDI)), cycloaliphatic isocyanates (e.g., 1-isocyanto-3, 3, 5-trimethyl-5-isocyanatomethyl-cyclohexane (IPDI), hydrogenated methylene diphenyl diisocyanate ($H_{12}$MDI)), heterocyclic isocyanates, and aromatic isocyanates (e.g. methylene diphenyl diisocyanate (MDI), toluene diisocyanate (TDI)), napthalene-1,5-diisocyanate (NDI), 3,3'-dimethyl-biphenyl-4,4'-diisocyanate (TODI), dimeric MDI, the uretdione of MDI (MDIU), the uretdione of TDI (TDIU), 3,3'-diisocyanate-4,4'-dimethyl-N,N'-diphenyl urea (TDIH), addition product of 2 moles of 1-methyl-2,4-phenylene-diisocyanate with 1 mole of 1,2-ethandiol or 1,4-butandiol; addition product of 2 moles of MDI to 1 mole diethylene glycol; and the combinations thereof.

Useful first polyurethane dispersions preferably anionic polyurethane dispersions. Examples of useful commercially available first polyurethane dispersions include DISPERCOLL U53, DISPERCOLL U56, DISPERCOLL U XP 2682, DISPERCOLL U 8755, DISPERCOLL U 2815 XP, DISPERCOLL 054, DISPERCOLL U XP 2710, DISPERCOLL U 2849 XP, DISPERCOLL U42 AND DISPERCOLL U XP 2643, all of which are available from Bayer Material Science AG (Germany); and LUPHEN 585, LUMEN 3615, LUPHEN D 207 E and LUPHEN D DS 3548, all of which are available from BASF, Germany.

Second Polyurethane Dispersion

The second polyurethane dispersion includes a second polyurethane that is different from the aforementioned first polyurethane. The second polyurethane is a carboxyl acid functional polyurethane having an acid number of from 10 to 30, or from 15 to 25 mg/g KOH.

The second polyurethane preferably has a relatively low weight average molecular weight (Mw). Preferably the second polyurethane has a unimodal weight average molecular weight of no greater than 50,000 g/mole.

The second polyurethane is film-forming and can be a single type of carboxyl acid functional polyurethane or a blend of at least two different carboxyl acid functional polyurethanes.

The second polyurethane may include additional functional groups that are capable of reacting with isocyanate functional groups. Useful functional groups reactive to isocyanate include e.g., hydroxyl, amino, amide, mercaptan, and combinations thereof.

An example of a useful commercially available polyurethane dispersion include DISPERCOLL U 2824 XP from Bayer Material Science AG (Germany).

The first polyurethane and a second polyurethane are present such that a coated adhesive layer, which is derived from the aqueous adhesive composition of the invention, includes at least 30% by weight, at least 50% by weight, at least 70% by weight, at least 80% by weight, from about 30% by weight to about 97% by weight, from about 50% by weight to about 95% by weight, from about 70% by weight to about 95% by weight, or from about 80% by weight to about 95% by weight of the mixture of a first polyurethane and a second polyurethane, based on the weight of the dried coated adhesive layer.

The second polyurethane is present in an amount of at least 10% by weight, at least 20% by weight, from about 10% by weight to about 60% by weight, from about 20% by weight to about 50% by weight of the second polyurethane, based on the weight of the mixture of a first polyurethane and a second polyurethane.

Surface-Deactivated Solid Isocyanate

The surface-deactivated solid isocyanate is in the form of a solid particulate and functions as a crosslinking agent. Useful surface-deactivated solid isocyanate can be derived from a polyisocyanate and a deactivating agent.

A variety of polyisocyanates are suitable including, e.g., aliphatic, cycloaliphatic, heterocyclic, and aromatic isocyanates. Specific examples of useful polyisocyanates include dimeric 4,4'-MDI, the uretdione of MDI (MDIU), the uretdione of TDI (TDIU), 3,3'-diisocyanate-4,4'-dimethyl-N,N'-diphenyl urea (TDIH), the addition product of 2 moles of 1-methyl-2,4-phenylene-diisocyanate and 1 mole of 1,2-ethandiol or 1,4-butandiol, the addition product of 2 moles of MDI and 1 mole of diethylene glycol, the isocyanurate of isophoron diisocyanate (IPDI-T), and combinations thereof.

Commercially available solid isocyanates that can be surface-deactivated include the uretdione of TDI (e.g., ADOLINK TT available from Rhein Chemie Rheinau GmBH (Mannheim, Germany), DANCURE 999 available from Danquinsa GmBH (Germany), THANECURE T9 (TSE, Clearwater, Fla.)); DESMODUR LP BUEJ 471, which is a micronized IPDI-isocyanurate available from Bayer Material Science AG (Germany); and the uretdione of MDI (GRILBOND A2BOND available from EMS-Griltech (Switzerland)).

The surface-deactivated solid isocyanate preferably is deactivated by the presence of a deactivating agent. Useful deactivating agents include, e.g., primary aliphatic amines, secondary aliphatic amines, diamines, polyamines, hydrazine derivatives, amidines, guanidines, and combinations thereof. Examples of useful deactivating agents include ethylene diamine, 1,3-propylene-diamine, diethylene triamine, triethylene tetramine, 2,5-dimethyl-piperazine, 3,3'-dimethyl-4,4'-diamino-dicyclohexyl methane, methyl nonane-diamine, isophorone diamine, 4,4'-diaminodicyclohexyl methane, diamino polypropylene ether, triamino polypropylene ether, polyamido amine, the deactivating agents disclosed in U.S. Pat. No. 6,348,548 B1, and combinations thereof.

The surface-deactivated solid isocyanates can be prepared according to a variety of methods including, e.g., the processes described in U.S. Pat. No. 6,348,548 B1, which is incorporated herein by its entirety.

The surface-deactivated solid isocyanate can be in a variety of forms including, e.g., aqueous suspensions, micronized particles, and combinations thereof.

Useful commercially available surface-deactivated solid isocyanates include, e.g., DISPERCOLL BL XP 2514 (an aqueous suspension of surface-deactivated isocyanate containing approximately 40% of the uretdione of TDI) available from Bayer Material Science AG (Germany)) and Aqualink U available from Aquaspersions Limited (UK).

The surface-deactivated solid isocyanate can be blended with the polyurethane dispersion to forma stable aqueous composition.

The aqueous composition preferably includes at least 0.25% by weight, at least 0.5% by weight, at least 1% by weight, from about 0.25% by weight to about 10% by weight, from about 0.5% by weight to about 8% by weight, or even from about 1% by weight to about 5% by weight surface-deactivated isocyanate, based on the weight of the aqueous composition.

Additional Components

The aqueous composition optionally include a variety of other additives including, e.g., other polymers, catalysts (e.g. amine based), preservatives, pH modifiers (e.g. aqueous ammonia), adhesion promoters (e.g., silane containing compounds), tackifiers, (e.g., ground tackifiers), pigments, surfactants, antifoaming agents, defoaming agents, fungicides, bactericides, thickening agents, blocking agents and stabilizers (e.g. amines), fillers (e.g. carbonates, talc, starch), materials that help the adhesive film to form a barrier (e.g. nano materials (e.g. mineral fillers, glass microbubbles), rheology modifiers, salts, and ground powders, electrically conductive materials (e.g. various metals silver)), and combinations thereof.

Other suitable polymers (which are refers to as a third polymer that can be included in the aqueous composition include, e.g., polyurethanes that are not reactive with isocyanate functionality; vinyl acetate ethylene copolymers (VAE); polyacrylates that are not reactive with isocyanate functionality; polyacrylonitriles (e.g., butadiene acrylonitrile); styrene butadiene rubber (SBR); and combinations thereof.

When a third polymer is present in the self-supporting, heat curable adhesive film, the sum of the first polyurethane, the second polyurethane, the surface-deactivated solid isocyanate, and the third polymer amounts to at least 90% by weight, at least 95% by weight, or even at least 98% of the weight of the dried, self-supporting, heat curable adhesive film.

One example of a useful stabilizer is JEFFAMINE T-403 POLYETHERAMINE commercially available from Huntsman Corporation (The Woodlands, Tex.).

Useful thickeners include, e.g., BORCHI® GEL A LA available from OMG Borchers GmbH (Langenfeld, Germany) and STEROCOLL HT commercially available from BASF Chemical Company (Ludwigshafen, Germany).

One example of a useful preservative is ACTICIDE MBS commercially available from Thor GmbH (Speyer, Germany).

Article

The aqueous adhesive composition can be used to manufacture an article including at least one substrate, or an article including a first substrate and a second substrate.

In one embodiment, an article includes at least one substrate and an adhesive layer disposed on one major surface of the substrate. The adhesive layer includes a surface-deactivated solid isocyanate, a first polyurethane having functional groups reactive with isocyanate, and a second polyurethane different from the first polyurethane. The second polyurethane is a carboxyl acid functional polyurethane having an acid number of from 10 to 30, and a unimodal weight average Molecular Weight (Mw) of no greater than about 50,000 g/mole.

The substrate can be a metallic substrate or a non-metallic substrate.

In another embodiment, an article includes a first substrate, a second substrate, and an adhesive layer derived from any one of the aforesaid aqueous adhesive compositions of the invention disposed between the two substrates, and in direct contact with the two substrates. One of the first substrate and the second substrate is a metallic substrate. The other one of the first substrate and the second substrate can be the same or different substrate, and, if different, can be selected from any one of the herein described "non-metallic" substrates, or from different type of metallic substrates.

Examples of metallic substrates include aluminum, steel, copper, metallic composites, metallic foil, metallic film, metallized surfaces, and combinations thereof.

Examples of non-metallic substrates include various textiles (e.g. fabrics e.g. microfiber based polyethylene, cotton, canvas and nonwovens), artificial leathers and furs, foils (e.g. decorated foils), papers, films (e.g. plastic films (e.g. polyester, polyimide (i.e. Kapton), polypropylene and polyethylene)), and combinations thereof.

Examples of other non-metallic substrates include tiles, ceramics, plastics e.g., polyamides (e.g. nylon), polyurethanes, polycarbonate, acrylonitrile-butadiene-styrene (ABS), ABS/polycarbonate blends, polyether ether ketone (PEEK), etc.), plastic composites (e.g. fiber reinforced plastics), glass, cardboard, wood and wood-containing products.

The first and second substrates can be of the same or different material, but at least one of the first and second substrates is a metallic substrate.

The substrates can be in the form of a single layer or multiple layers.

The substrates can be pre-treated to improve adhesion of the adhesive film to the substrate. Useful pre-treatments include, e.g., corona, plasma, flame, chemical primer, and combinations thereof.

The article of invention can be made by a variety of methods including depositing the aqueous composition onto a major surface of a substrate, and drying the aqueous composition at a temperature below the temperature at which the activation of the cure between the blend of the two polyurethanes and the surface-deactivated solid isocyanate occurs to form a coated article. The resulting coated substrate is storage-stable at room temperature, and can be stored for a later date to be used.

In one embodiment, an article having a first substrate is prepared by applying any one of the aforesaid aqueous adhesive compositions to one major surface of the first substrate, and drying the applied adhesive composition to form a coated adhesive layer on the first major surface of the first substrate, thereby forming a pre-coated article (or substrate), which could be stored and transported to a different location. Once ready, the pre-coated article can be used to make a final article by bringing a second substrate into contact with the coated adhesive layer such that the first and the second substrate is in direct contact with the coated adhesive layer in between the two substrates to form the article, and applying heat and pressure to the article to allow the coated adhesive layer cure such that the two substrates are adhered together through the adhesive layer.

In another embodiment, an article having a first substrate and a second substrate is prepared by applying any one of the aforesaid aqueous adhesive compositions to one major surface of the first substrate, bringing a second substrate into contact with the adhesive layer such that the first and the second substrates are in direct contact with the adhesive layer in between the two substrates to form the article, and applying heat and pressure to the article to allow the adhesive layer to cure such that the two substrates are adhered together.

In one embodiment, a major surface of each of the first and the second substrates can be pre-coated with any one of the aforesaid aqueous adhesive compositions prior to being brought into contact with each other.

The article can be heated to a temperature to activate the isocyanate and begin the curing process. In some embodiments, the article can be heated to a temperature e.g., at least 60° C., at least 75° C., from about 60° C. to about 150° C., or from about 75° C. to about 100° C. to activate the cure of the heat curable adhesive layer to form a cured bond with a substrate, or between two substrates. Pressure can be used to help forming the bond (e.g. membrane or bladder press, heated platens).

Uses

The aqueous adhesive composition can be used in the manufacture of a variety of articles including, e.g., automobile parts, truck bed covers, textile laminations, various assembled goods, carpet backing, and electronics.

The invention will now be described by way of the following examples. All ratios and percentages are by weight unless otherwise indicated.

EXAMPLES

Test Procedures

Test procedures used in the examples and throughout the specification, unless stated otherwise, include the following.

Molecular Weight

The gel permeation chromatography (GPC) molecular weight distribution curve of each polyurethane sample is obtained using a Waters 2695 Separations Module connected to a Waters 2414 Refractive Index (RI) detector, running 0.05 molar (M) lithium bromide dimethyl formamide (LiBr/DMF) mobile phase through two Agilent Resipore GPC columns. The weight average molecular weight (Mw) data is calculated versus polymethyl methacrylate standards.

Peak Melting Temperature and Enthalpy of Fusion Test Method

The peak melting temperature and enthalpy of fusion (ΔH) of the dried, heat curable adhesive film is determined, after removal of the heat history, using a Perkin Elmer, Pyris 1 Differential Scanning calorimetry (DSC), at a heating rate of 10° C. per minute.

Acid Number

Acid number is determined according to ASTM D 4662 entitled "Standard Test Method for Polyurethane Raw Materials: Determination of Acid and Alkalinity Number of Polyols" with the exception that isopropanol is used instead of ethanol.

Cured 180 Degree Peel Strength Test Method

The cured 180 degree (180°) peel strength is determined, using an Instron tester model 5500R (Instron Corporation, Norwood, Mass.), according to the ASTM D903-98 test method entitled "Standard test method for Peel or Stripping Strength of Adhesive Bonds", with the following exceptions:

1. Test Speed/Rate of travel of the power-actuated grip: A speed of 300 mm/min is used for sample testing instead of 305 mm/min.
2. Length of test substrates and bond:
    7 inch (in) (177.8 mm) flexible substrates are used for testing instead of 12 in (304.8 mm) flexible substrates
    3 in (76.2 mm) rigid substrates are used for testing instead of 8 in (203.2 mm) rigid substrates
    A bond length of 2.5 in (63.5 mm) inches is used for testing instead of a bond length of 6 in (152.4 mm); and
3. Samples are conditioned 25° C.+/−1° C. and 50%+/−2% relative humidity for 24 hours.

The mean of the average peel strength for a set of six samples is reported in N/25 mm.

Sample Preparation for Cured 180 Degree Peel Strength Test

A 1 in×3 in×0.040 in (25.4 mm×76.2 mm×1 mm) piece of a rigid Stainless Steel (SS) substrate (Grade 304, from Q-Lab, Westlake, Ohio) is wiped down with isopropyl alcohol (IPA) and dried. A 1 in×2.5 in×0.004 in (25.4 mm×63.5 mm×0.1 mm) piece of an adhesive film is removed from the release liner and is placed on the SS substrate. A 1 in×7 in (25.4 mm×177.8 mm) flexible nylon substrate is then placed on top of the SS/adhesive film layered construction. The nylon fabric is NYLON SUPPLEX (Invista, Wichita, Kans.), Blue Periwinkle Fabric with a weight of 117.4 g/m², or equivalent. The SS/adhesive film layer/nylon fabric layered construction is then bonded together using a heated platen press at a temperature sufficient to activate curing of the adhesive layer. The construction is bonded together using a heated platen press under the following conditions:

Bond Line Temperature: 90° C.

Pressure: 22 N/cm² (on the sample); and

Time at Bond Line Temperature: 60 seconds.

An example of a suitable heated platen press Sonitek Spectrum Heat Sealer, Model SB-3 4.2 commercially available from Sonitek (Milford, Conn.)

EXAMPLES

Acid numbers and weight average molecular weights of commercially available polyurethane dispersions were tested according to there herein described Acid Number and Molecular Weight Test Methods. The results are set forth in Table 1 below.

TABLE 1

|  | Acid Number (from Carboxylic Acid) | Mw (g/mole) |
| --- | --- | --- |
| Dispercoll U XP2682 | 0 | 73,800 |
| Dispercoll U56 | 0 | 73,600 |
| Dispercoll U 2824XP | 20.2 | 42,900 |
| Bayhydrol UH2606 | 18.1 | Bimodal, 1,690,000 and 50,500 |
| Neorez R-9249 | 15.4 | Bimodal, 1,410,000 and 25,000 |

Examples 1-3 and Comparative Examples 1-3

A test specimen of each of the Control, Comparative Examples 1-3 and Examples 1-3, was derived from each of the aqueous compositions as set forth in Table 2, and was prepared according to the sample preparation method set forth in the Cured 180 Degree Peel Strength Test Method at a film thickness of 100 μm+/−10 μm.

The test specimen was then tested according to the herein described various test methods. The results are also set forth in Table 2.

TABLE 2

|  | Control* | Com Ex 1 | Com Ex 2 | Com Ex 3 | Ex 1 | Ex 2 | Ex 3 |
| --- | --- | --- | --- | --- | --- | --- | --- |
| Dispercoll U XP2682 | — | 60 | 60 | 25.0 | 60 | 73.7 | 69.7 |
| Dispercoll U56 | — | — | — | — | — | — | — |
| Dispercoll U 2824XP | — | — | — | 69.7 | 32.7 | 21.0 | 21.0 |
| Bayhydrol UH2606 | 32.7 | — | — | — | — | — | — |
| Neorez R-9249 | — | 32.7 | — | — | — | — | — |
| Dispercoll BL XP 2514 | 6 | 6 | 4 | 6 | 4 | 6 |
| Jeffamine T-403 | 0.1 | 0.1 | 0.1 | 0.1 | 0.1 | 0.1 | 0.1 |
| Borchigel A LA | 1.2 | 1.2 | 1.2 | 1.2 | 1.2 | 1.2 |

TABLE 2-continued

| | Control* | Com Ex 1 | Com Ex 2 | Com Ex 3 | Ex 1 | Ex 2 | Ex 3 |
|---|---|---|---|---|---|---|---|
| ΔH(J/g) | 43.7 | 27.5 | 33.1 | 43.2 | 39.4 | 41.9 | 49.6 |
| Melting Peaks Temp. (° C.) | 47.7, 53.9 | 48.5, 55.5 | 49.5, 54.0 | 47.6 | 48.7, 53.7 | 46.7, 53.7 | 49.6 |
| Peel Strength (N/25 mm) | 69.3 +/− 13.4 | 21.9 +/− 7.4 | 37.4 +/− 2.5 | 58.1 +/− 2.2 | 94.6 +/− 7.9 | 103.1 +/− 3.4 | 92.0 +/− 5.3 |

*EM9002-100, commercially available from HE Fuller (St. Paul, MN)

Other embodiments are within the claims. All publications cited herein are incorporated herein in their entirety.

We claim:

1. An aqueous adhesive composition comprising:
   a surface-deactivated solid isocyanate;
   a first polyurethane dispersion including a first polyurethane having functional groups reactive with isocyanate; and
   a second polyurethane dispersion including a second polyurethane different from the first polyurethane, the second polyurethane being a carboxylic acid functional polyurethane having an acid number of from 10 to 30, and a unimodal weight average molecular weight (Mw) of no greater than about 50,000 g/mole.

2. The aqueous adhesive composition of claim 1, wherein the first polyurethane has a weight average molecular weight (Mw) of no less than about 50,000 g/mole.

3. The aqueous adhesive composition of claim 2, wherein the first polyurethane has a weight average molecular weight (Mw) of no greater than about 125,000 g/mole.

4. The aqueous adhesive composition of claim 1, wherein the first polyurethane includes functional groups comprising hydroxyl, amino, carboxylic acid, amide, mercaptan, and combinations thereof.

5. The aqueous adhesive composition of claim 1, wherein the surface-deactivated solid isocyanate is in an amount of from about 0.25% by weight to about 10% by weight, based on the weight of the composition.

6. The aqueous adhesive composition of claim 1, wherein the second polyurethane comprises urea groups.

7. The aqueous adhesive composition of claim 6, wherein the first polyurethane has an Mw of no less than about 50,000 g/mole.

8. The aqueous adhesive composition of claim 6, wherein the functional groups are selected from the group consisting of hydroxyl, amino, amide, mercaptan, and combinations thereof.

9. The aqueous adhesive composition of claim 6, wherein, when the aqueous adhesive composition is in the form of a dried film, the film exhibits an enthalpy of fusion of from about 35 Joules/gram to about 70 Joules per gram.

10. The aqueous adhesive composition of claim 1, wherein, when the aqueous adhesive composition is in the form of a dried film, the film exhibits an enthalpy of fusion of from about 35 Joules/gram to about 70 Joules per gram.

11. The aqueous adhesive composition of claim 1, wherein the functional groups are selected from the group consisting of hydroxyl, amino, amide, mercaptan, and combinations thereof.

12. An article comprising:
    a first substrate,
    a second substrate, and
    an adhesive layer derived from the aqueous adhesive composition of claim 1 disposed between the first substrate and the second substrate.

13. The article of claim 12, wherein of the first substrate and the second substrate is a metallic substrate.

14. A method of making an article having a first substrate, the method comprising:
    applying the aqueous adhesive composition of claim 1 to a first major surface of the first substrate, and
    drying the aqueous adhesive composition to form a coated adhesive layer on the first major surface of the first substrate.

15. The method of claim 14, further comprising
    bringing a second substrate into contact with the adhesive layer such that the first and the second substrate is in direct contact with the adhesive layer in between to form the article, and
    applying heat and pressure to the article.

16. The method of claim 15, wherein one of the first and the second substrates is a metallic substrate.

17. The method of claim 15, wherein the second substrate has been pre-coated with an adhesive layer derived from the aqueous adhesive composition of claim 1, prior to being brought into contact with the coated adhesive layer on the first substrate.

18. A method of making an article having a first substrate and a second substrate, the method comprising:
    applying the aqueous adhesive composition of claim 1 to a first major surface of the first substrate to form a coated adhesive layer thereon,
    bringing the second substrate into contact with the coated adhesive layer such that the first and the second substrates are in direct contact with the coated adhesive layer in between to form the article, and
    applying heat and pressure to the article.

19. The method of claim 18, wherein one of the first and the second substrates is a metallic substrate.

20. The method of claim 18, wherein the second substrate has been pre-coated with an adhesive layer derived from the aqueous adhesive composition of claim 1, prior to being brought into contact with the coated adhesive layer on the first substrate.

21. An article comprising:
    a substrate, and
    an adhesive layer disposed on at least one major surface of the substrate, the adhesive layer comprising a surface-deactivated solid isocyanate, a first polyurethane having functional groups reactive with isocyanate, and a second polyurethane different from the first polyurethane, the second polyurethane being a carboxylic acid functional polyurethane having an acid number of from 10 to 30, and a unimodal weight average molecular weight (Mw) of no greater than about 50,000 g/mole.

22. The article of claim 21, wherein the substrate is a metallic substrate or a non-metallic substrate.

23. The article of claim 21, wherein the adhesive layer has a thickness of from about 10 microns to about 200 microns.

24. The article of claim 21, wherein the adhesive layer has an enthalpy of fusion of at least about 25 J/g.

25. The article of claim 21, wherein the adhesive layer exhibits a 180 degree peel strength that is at least 30% greater than the 180 degree peel strength of Control I, when tested according to the Cured 180 Degree Peel Strength Test Method.

26. The article of claim 21, wherein the sum of the surface-deactivated solid isocyanate, the first polyurethane, the second polyurethane, and a third polymer amounts to at least about 95% by weight of the adhesive layer.

* * * * *